Jan. 21, 1936. T. J. KELLY 2,028,220
SEED BED COVER
Filed Oct. 22, 1935
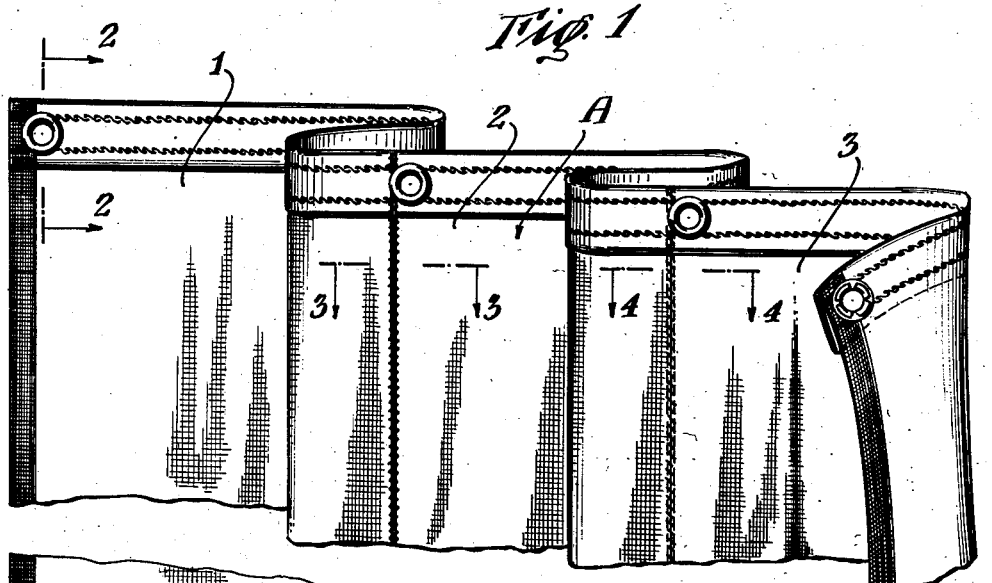
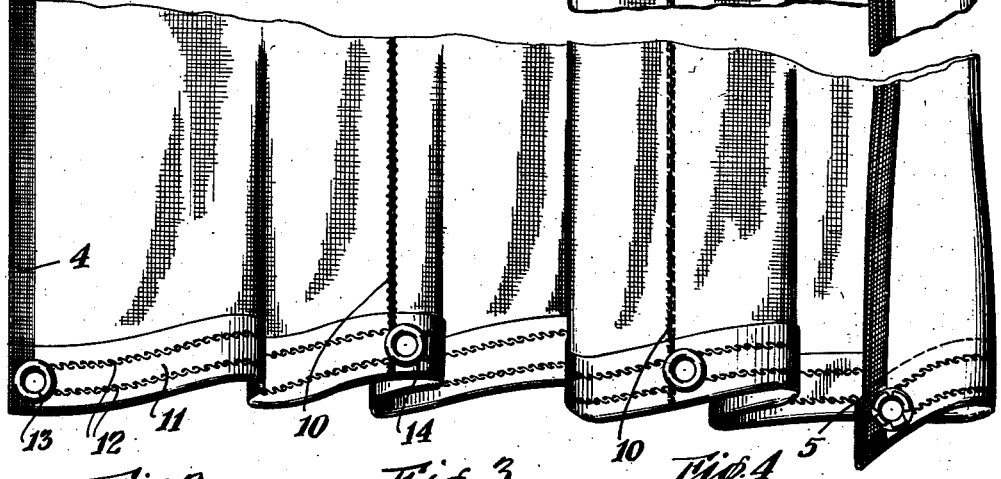
INVENTOR
Timothy J. Kelly
BY
Hoguet, Neary & Campbell
ATTORNEYS Patented Jan. 21, 1936

2,028,220

UNITED STATES PATENT OFFICE 2,028,220

SEED BED COVER

Timothy J. Kelly, Shannon, Ga., assignor to Southern Brighton Mills, Shannon, Ga., a corporation of Georgia Application October 22, 1935, Serial No. 46,061

9 Claims. (Cl. 47—28)

This invention relates to a new and useful net for covering seed and plant beds containing tobacco, chrysanthemum, and other plants, which are subject to attack by insects and frost.

Nets have long been used for covering various types of plants to protect them from insects and worms as well as frost. These nets usually consisted of a light weight netted textile, somewhat similar to cheesecloth, and were used in a single width of about 40 inches and up to 100 feet in length. These nets had a tape selvage along each edge and since they were merely cut from a bolt of the material, the ends of the net were generally left raw. These nets were thrown over the rows of plants and the edges were held in position at intervals by stakes or other devices with resulting tearing of the net.

Later it was found desirable to cover a greater width of seed beds with the nets and, as a consequence, two strips of the netting were sewed together. The sewing consisted of running a double seam along overlapped tape selvage edges. The outer edges of the net produced by sewing the two strips together remained the same and were subjected to even greater tearing and rigging strains in staking down, because of the increased width. One disadvantage of overlapping and sewing the tape selvage edges together is that the thickened portion tends to hold moisture, mold, and rot. As a result the net is weakened along the seams and its useful life decreased. Also when nets are used in the cultivation of flowers the shadow produced by the thickened portion at the seam is sometimes found to be particularly objectionable, since the shadow cast will sometimes cause a variation in the color of the flowers and unequal growth.

An object of the present invention is to produce a net which will have a greater useful life and one which obviates the difficulties encountered in the prior nets.

Another object is to provide a net in which imposed strains will be distributed in a manner to minimize tearing or ripping.

Another object is to provide a net with means for receiving pins or stakes for supporting and fixing the edges and to so locate these means that they will be in the best position to receive the stresses which will be placed upon the nets.

As shown in the drawing, Fig. 1 is a view of the net broken transversely longitudinally.

Fig. 2 is a sectional view of a detail of the net taken on line 2—2 of Fig. 1;

Fig. 3 is a sectional view of a detail of the net taken on line 3—3 of Fig. 1; and Fig. 4 is a sectional view of a detail of the net taken on line 4—4 of Fig. 1.

The improved net indicated generally as A consists of two or more strips of net-like material indicated as 1, 2 and 3, the outer strips 1 and 3 having tape selvage outer edges 4 and 5 respectively. The tape selvage edges consist generally of a more closely woven portion in the cloth, forming a tape-like edge of approximately ½ inch in width.

The inner edges of strips 1 and 3 and both edges of strip 2 have wire selvages as indicated by reference characters 6, 7, 8 and 9, shown in Figs. 3 and 4. Wire selvage edges consist of narrow closely woven edge portions, leaving no raw edges and are approximately $\frac{1}{16}$ of an inch in width.

The wire selvage edges of the strips are attached to each other by overedge stitching as shown at 10 in Figs. 1, 3 and 4. The overedge stitch consists of a loop formation around the superimposed wire selvage edges. This seam has the advantage of constricting the material in the stitching when stress is placed transversely upon it, thereby binding and holding the wire selvages more tightly. This seam also is less likely to separate or tear than other seams and is stronger than the body of the cloth.

This type of center seam construction has several advantages, the first of which is that the seam is very narrow and, as a consequence, does not cast the shadow that was objectionable in the prior nets. Also there is less material in the seam to hold moisture and, as a consequence, there is less danger of the net rotting or molding. Not only that, but because of the seam construction, less material is required to produce the same size net as that previously made in the prior art.

It will be noted in Figs. 1, 3 and 4 that the center seams are located alternately on opposite sides of the net. It is found of great advantage to produce the net with the seams so arranged. In making these nets, the material is fed from a pair of vertically superposed reels onto a table, the strips being superposed and stitched along one longitudinal edge and rolled onto another reel. When the edge is entirely stitched, the reel holding the superposed layers of materials is shifted to the holder for the upper reel of the original pair. An additional reel of material is then placed in the lower holder, and this material and the lower unseamed edge of the superposed strips may be stitched together in the same stitching machine. These three superposed strips now united into a single strip are wound onto a single reel. This procedure may be repeated as often as desired to produce a net of the desired width.

The net A at this point consists of a wide strip having raw edges at the ends only.

To prevent raveling and tearing of the net, the end portions are turned over into a three-layer construction with the raw end of the material completely covered as shown at 11, and a double row of stitching 12—12 run therein to hold the overlap. The net, therefore, has no raw edges at any place in the construction to tear or ravel.

In order to control and distribute the strains imposed upon my net so that tearing and ripping is minimized, I have placed grommets 13, 14 in the tape selvages 4 and the overlapped ends 11 at selected points as shown in Fig. 1 of the drawing.

The grommets are not placed in a haphazard relation to the net but rather are placed at points to give a net of maximum strength. It will be noted that the grommets 13 are located at the corners, at the juncture of the tape selvage and the overlap, and between the double seams. It should also be noted that the flange portions of the grommets are arranged to grip the strongest portions such as the seam, hem or stitching. This construction has the advantage that stresses will be placed upon the net at the grommets and that at least a portion of any stress placed upon the net will be transferred to the heavier seam portions and the tape selvage, thereby relieving the thinner net material of the major portion of the stress.

The same selection is true in relation to the longitudinal seams and the end seams. The grommets 14 overlap the stitching 10, 12 in each, thereby locating the grommets at the portions of greatest strength.

This location of the grommets produces the strongest possible net because in practically every instance the seams with the heavy stitching therein are engaged with the grommets and support the main load of the net. Also since the grommets grip the seams, the slippage of the threads in the seams and the material adjacent the grommets is prevented.

An additional feature of the construction lies in the manner in which the grommets themselves are applied. The net material is not cut at any point. The threads are merely pushed aside to receive the shank of the grommet and the flange portions are then pressed onto the compacted material adjacent the opening.

It will thus be seen that a net is produced having greater strength. This net may be used repeatedly because of the provisions made for receiving the pins or staking means without injuring the material. Because of the seam construction, it is more resistant to molding or rotting. It is more resistant to tearing and ripping because of the reinforced construction and the use of definite reinforced retaining points. Also, my net overcomes any objection as to undesirable shading of the plants.

It will be understood that the disclosure of the drawing and the specification are illustrative only and that the following claims define the scope of the invention.

What I claim is:

1. A net for covering seed and plant beds, comprising a plurality of strips of netted material, having at least one wire selvage, said strips being connected at their adjacent edges by narrow seams made up of overedged wire selvages of adjacent strips forming a single wide strip of said netted material, the seams being alternately on opposite sides of the net, and said seams being substantially only the width of the overedge stitching.

2. A net for covering seed and plant beds, comprising a plurality of strips of netted material connected at their adjacent longitudinal edges by narrow seams of overedge stitching forming a single wide net free from longitudinal overlapped seams, said narrow seams being substantially the width of the overedge stitching.

3. A net for covering seed and plant beds, comprising a plurality of strips of netted material connected at their adjacent longitudinal edges by narrow overedge seams forming a single wide net free from longitudinal overlapped seams, said net having bound and stitched end portions, and reinforced points at intervals along the edges of said net for fixing purposes, said reinforced points being positioned at suitable points to grip said seams and stitchings whereby strains are distributed.

4. In a net of the class described, the corner construction which consists of material having intersecting edge portions, one being a selvage edge, and the other being a lapped edge having stitching therein, and a grommet passing through the intersecting edge portions and gripping the stitching.

5. In a net of the class described, the construction consisting of material having a seam, a folded over end portion having stitching for holding the folded over portion, and a grommet passing through the material adjacent the seam and the folded over portion, and gripping the seam and the stitching of the folded portion.

6. A net of the class described, consisting of a strip of fabric having longitudinal seams, longitudinal selvage edges, folded over ends held by stitching, and grommets passing through the edges of the strip, some of which engage the selvage edge and the stitching in the folded over ends, and others of which engage the stitching and the seams.

7. A net of the class described, consisting of a strip of fabric having longitudinal seams, longitudinal tape selvage edges, folded over ends held by stitching, and grommets passing through the material adjacent the edges, some of which grip the stitching and the selvage edge, and others which grip the seams and stitching.

8. A net of the class described, comprising a wide strip of fabric having stitching therein and free from raw edges, and grommets spaced along the edge portions in such relation that the stresses exerted through the grommets are carried mainly by the stitching.

9. A method of making a net which consists in providing a plurality of strips of fabric, each of which has at least one wire selvage edge, laying one strip on top of another and overedge stitching one adjacent wire selvage edge of each together, then superimposing the attached strips and another strip and overedge stitching the free wire selvage edge of the center strip to the adjacent wire selvage edge of the later supplied strip.

TIMOTHY J. KELLY.

DISCLAIMER 2,028,220.—*Timothy J. Kelly*, Shannon, Ga. SEED BED COVER. Patent dated January 21, 1936. Disclaimer filed July 28, 1942, by the assignee, *Brighton Mills, Inc.*

Hereby enters this disclaimer to claims 4, 5, 6, 7, and 8.

[*Official Gazette October 20, 1942.*]